United States Patent Office
3,022,293
Patented Feb. 20, 1962

3,022,293
NOVEL ETHYLENIC COMPOUNDS
Lee A. Miller, Dayton, Ohio, assignor to Monsanto Chemical Company, St. Louis, Mo., a corporation of Delaware
No Drawing. Filed Nov. 27, 1959, Ser. No. 855,498
13 Claims. (Cl. 260—239.3)

The present invention relates to novel ethylenic compounds and to the method of making the same, and more particularly it pertains to novel ethylenic compounds having insecticidal activity.

An object of this invention is to provide a novel addition product containing an ethylenic group and having good insecticidal properties.

Another object is to provide a novel method of making the addition product mentioned above.

Other objects and advantages will become apparent from the following description and explanation thereof.

The addition product of the present invention is prepared by reacting a compound containing active hydrogen bonded to nitrogen with a propiolic acid compound.

The compound containing active hydrogen bonded to nitrogen is selected from lactams and imides. The lactams to be used in the present invention are those containing, for example, about 4 to 9 membered rings, including propiolactams, pyrrolidones, valerolactams, caprolactams, enantholactams, etc. These lactams may be substituted or unsubstituted, and when substituted may contain such substituents as alkyl, alkenyl, alkynyl, nitro, halogen, nitroso, cyano, carboalkoxy, acyloxy, cycloalkyl, cycloalkenyl, tertiary amino, alkoxy, alkoxyalkyl, aryl, alkaryl, aralkyl, etc. The substituents are attached to carbon atoms of the ring, leaving the nitrogen with an active hydrogen and thereby it can readily react with the propiolic acid compound by addition to the triple bond. Specific examples of the lactams are 3-propylpropiolactam, 4-chloropyrrolidone, 4-cyano-6-chlorovalerolactam, 5 - nitrocaprolactam, 7-dimethylaminoenantholactam, 4-phenylpropiolactam, 5-methylvalerolactam, 5-benzylcaprolactam, 5-nitrosoenantholactam, etc.

The imides to be used in the reaction may be cyclic or aliphatic and may contain, for example, from about 4 to 10 membered rings or about 4 to 54 carbon atoms in the case of the aliphatic type. The cyclic imides include, for example, succinimide, glutarimide, adipimide, pimelimide, suberimide, etc. These imides may be substituted or unsubstituted, and if substituted they may contain substituents such as halogen, nitro, alkyl, aryl, alkoxy, cyano, nitroso, carboalkoxy, acyloxy, alkaryl, aralkyl, cycloalkyl, cycloalkenyl, alkoxyalkyl, tertiary amino, alkynyl, alkenyl, etc. The aliphatic imide may be represented by the formula

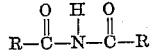

wherein R may be the same or different aliphatic radicals including alkyl, alkenyl, alkynyl, alkoxyalkyl, cycloalkyl, cycloalkenyl, as well as aliphatic groups in which are present radicals such as nitro, nitroso, cyano, halogen, alkoxy, carboalkoxy, etc. Each aliphatic group may contain from about 1 to 26 carbon atoms. Specific examples of the cyclic and aliphatic imides are 3-methylsuccinimide, 4-ethylglutarimide, 4-propyladipimide, 4-pentylpimelimide, 3-methylsuberimide, 3-nitrosuccinimide, 4-nitrosoglutarimide, 3-cyanoadipimide, 4-chloropimelimide, 4-ethoxysuberimide, 4-phenylglutarimide, 4-benzyladipimide, 4-cyclohexylpimelimide, 3-chloro-6-nitrosuberimide, diacetylamine, 3-chlorodiacetylamine, 3,3'-dichlorodiacetylamine, 3-phenyldiacetylamine, 3-nitrodiacetylamine, 3 - methoxydiacetylamine, di-iso-propionylamine, 4 - chlorodi - n - propionylamine, 4-nitrodi-n-propionylamine, 3-cyanodi-n-propionylamine, di-iso-butanoylamine, 4-chlorodi-n-butanoylamine, 3-methoxydi-n-butanoylamine, 3 - chloro-4'- phenyldi-n-butanoylamine, 3-nitrodi-n-butanoylamine, di-iso-pentanoylamine, 5-chlorodi-n-pentanoylamine, 6-nitrodi - n - pentanoylamine, 3-cyanodi-n-pentanoylamine, 5-phenyl-di-n-pentanoylamine, di-iso-hexanoylamine, 7-chlorodi-n-hexanoylamine, 3-nitrodi-n-hexanoylamine, 5-cyanodi-n-hexanoylamine, di-iso-heptanoylamine, 4-chlorodi-n-heptanoylamine, 6-nitrodi-n-heptanoylamine, 7-nitrosodi-n- heptanoylamine, di-iso-octanoylamine, 3-bromodi-n-octanoylamine, 6-nitrodi-n-octanoylamine, 7-phenyldi-n-octanoylamine, 6-cyanodi-n-octanoylamine, etc.

For the purpose of the present specification and the appended claims "a propiolic acid compound" is intended to be generic to the acid, ester and amide.

The propiolic acid compound to be reacted with the lactam and/or imide may be represented by the following formula:

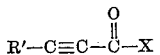

wherein R' is hydrogen or a non-reactive organic radical including a hydrocarbon radical, e.g., alkyl, aryl, cycloalkyl, alkaryl, aralkyl, alkenyl, etc., acyloxy, alkoxy, alkoxyalkyl, aryloxy, nitro, nitroso, halogen, sulfhydryl, etc., and X is selected from —OR" wherein R" is a hydrocarbon radical such as alkyl, aryl, alkynyl, alkenyl, alkaryl, aralkyl, cycloalkyl, cycloalkenyl, etc., and —NR"'$_2$ wherein R"' may be hydrogen or a hydrocarbon radical as defined under R". A non-reactive organic radical is, for the purpose of the present invention, one which does not react with the imide or lactam under reaction conditions nor will it react with the addition product to any significant extent. Specific examples of the propiolic acid compound are methyl propiolate, ethyl tetrolate, n-propyl propiolate, n-butyl propiolate, phenyl propiolate, phenyl n-hexyl propiolate, n-hexyl propiolate, n-butyl ethyl propiolate, isobutyl n-butyl propiolate, phenyltetrolate, etc. Specific exampes of amides are propiolamide, N,N-dimethylpropiolamide, N,N-diethylmethylpropiolamide, N-n-propylpropiolamide, N-n-butylpropiolamide, N-phenylpropiolamide, N-methylethylpropiolamide, N,N-diphenylpropiolamide, etc.

Cyanoacetylenes will undergo the same type of addition reaction as the propiolic acid compounds described above. In this connection, any of the lactams and imides may be reacted with the cyanoacetylenes under the conditions of reaction given for the propiolic acid compound to give an addition product in which the lactam and/or imide radicals are attached to the beta carbon of the cyano compounds.

The nitrogen compound containing active hydrogen may be reacted with the propiolic acid compound in any relative proportions, because any reactant which is left over can be readily separated from the reaction mass. However, the reaction between the propiolic acid compound and the nitrogen compound being one of addition, requires one mol of each on a stoichiometric basis.

The reaction between the propiolic acid compound and the nitrogen compound is usually carried out in the presence of an inert organic diluent. What may be done is to combined the reactants, diluent and catalyst and permit the mixture to stand until the desired reaction is effected to any extent desired. Thereafter, the diluent may be easily removed from the reaction mass by distillation. The diluents which may be employed are, for example, ether, dioxane, benzene, xylene, nitrobenzene, hexane, petroleum spirits, etc. The amount of diluent employed in a reaction may vary considerably, but in general about 50 to 500% by weight, based on the total reactants may be employed.

The reaction between the nitrogen compound and the propiolic acid compound is conducted generally at a temperature of about 0° to 150° C. The reaction may be effected under atmospheric, subatmospheric or superatmospheric pressure, depending upon the particular needs of the situation. The reaction is accomplished in the presence of a small amount of basic catalyst, which may be organic or inorganic in nature. Many classes of compounds may be used including the alkali or alkaline earth metal hydroxides or basic salts of the alkali or alkaline earth metals, e.g., sodium hydroxide, sodium carbonate, potassium carbonate, calcium hydroxide, etc.; the alkali metal alkoxides, e.g., sodium methoxide, etc.; the alkali or alkaline earth metal hydrides, e.g., sodium hydride, etc.; the quaternary amines, e.g., benzyltrimethylammonium hydroxide, etc. or an elemental alkali metal, e.g., sodium, potassium, lithium, etc.

The quantity of base employed as catalyst is relatively small, thus pointing to a catalytic effect rather than an operation in which one of the reactants combines with the base to form a necessary intermediate compound. In the present invention, the base may be used in amounts of about 0.001 to 5%, based on the weight of the propiolic acid compound, and preferably about 0.5 to 2% on the same basis. The quantity of catalyst employed in the reaction is such that no further treatment of final product is required for its removal. However, when a non-distillable, strong base is employed in amounts of about 2 to 5% by weight, it is preferred to wash the product with an aqueous acidic compound such as, for example, ammonium chloride, etc.

The addition product which is obtained by means of the present invention may be represented by the following formula:

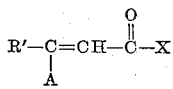

wherein R' is hydrogen or a non-reactive organic radical as defined hereinabove for the propiolic acid compound, X is selected from —OR" wherein R" is a hydrocarbon radical as defined above for the propiolic acid compound, and —NR"'$_2$ wherein R"' is either hydrogen or a hydrocarbon radical as defined above for the propiolic acid compound and A is a lactam or an imide radical. The following represent the classes and specific examples of compounds coming within the scope of the present invention: 1-carboalkoxyvinylpropiolactams, e.g., 1-carbomethoxyvinylpropiolactam, 1-(β-methyl)carbomethoxyvinylpropiolactam, 1-carboethoxyvinyl(3 - chloro)propiolactam, etc.; 1-carboxamidovinylpropiolactams, e.g., 1-(N-methyl)carboxamidovinylpropiolactam, 1-(N-methyl-β-ethyl)-carboxamidovinylpropiolactam, 1-carboxamidovinyl-(3-ethyl)propiolactam, etc.; 1-carboalkoxyvinylpyrrolidones, e.g., 1-carbomethoxyvinylpyrrolidone, 1-(β-methyl)carbomethoxyvinylpyrrolidone, 1-carbomethoxyvinyl(3-ethyl)-pyrrolidone, etc.; 1-carboxamidovinylpyrrolidones, e.g., 1-(N-methyl)carboxamidovinylpyrrolidone, 1-(N-methyl-β-ethyl)carboxamidovinylpyrrolidone, 1-carboxamidovinyl(3-ethyl)pyrrolidone, etc.; 1-carboalkoxyvinylvalerolactams, e.g., 1-carbomethoxyvinylvalerolactam, 1-(β-methyl)carbomethoxyvinylvalerolactam, 1-carboethoxyvinyl(3-chloro)valerolactam, etc.; 1-carboxamidovinylvalerolactams, e.g., 1-(N-methyl)carboxamidovinylvalerolactam 1-(N-methyl-β-ethyl)carboxamidovinylvalerolactam, 1-carboxamidovinyl(3-ethyl)valerolactam, 1-(β-n-propoxy)carboxamidovinyl(3-nitro)valerolactam, etc.; 1-carboalkoxyvinylcaprolactams, e.g., 1-carboethoxyvinylcaprolactam, 1-(β-methyl)carbomethoxyvinylcaprolactam, 1-carboethoxyvinyl(3-chloro)caprolactam, etc.; 1-carboxamidovinylcaprolactams, e.g., 1-(N-methyl-β-ethyl)carboxamidovinylcaprolactam, 1-carboxamidovinyl(3-ethyl)-caprolactam, 1-(β-n-propyl)carboxamidovinyl(3-chloro)- caprolactam, etc.; 1-carboalkoxyvinylenantholactams, e.g., 1-(β-methyl)carbomethoxyvinylenantholactam, 1-carbomethoxyvinyl(3-ethyl)enantholactom, 1-carboethoxyvinyl-(3-chloro)enantholactam, etc.; 1-carboxamidovinylenantholactams, e.g., 1-(N-methyl-β-ethyl)carboxamidovinylenantholactam, 1-carboxamidovinyl(3-ethyl)enantholactam, 1-(β-n-propyl)carboxamidovinyl(3-chloro)enantholactam, etc.; 1-carboalkoxyvinylsuccinimides, e.g., 1-carbomethoxyvinylsuccinimide, 1-(β-methyl)carboethoxyvinylsuccinimide, 1-carboethoxyvinyl(3-chloro)succinimide, 1-(β - n - propyl)carbomethoxyvinyl(3 - nitroso)succinimide, etc.; 1-carboxamidovinylsuccinimides, e.g.,1-(N-ethyl)carboxamidovinylsuccinimide, 1-(N-propyl-β-n-butyl)carboxamidovinylsuccinimide, 1-carboxamidovinyl(3-chloro)succinimide, 1-carboxamidovinyl(3-phenyl)succinimide, 1-(N-ethyl)carboxamidovinyl(3-methyl)succinimide, etc.; 1-carboalkoxyvinylglutarimides, e.g., 1-carbo-n-propoxyvinylglutarimide, 1-(β-methyl)carboethoxyvinylglutarimide, 1-carbomethoxyvinyl(3-propyl)glutarimide, 1-carboethoxyvinyl(3-chloro)glutarimide, 1-carbomethoxyvinyl(3-phenyl)glutarimide, etc.; 1-carboxamidovinylglutarimides, e.g., 1-(N-ethyl)carboxamidovinylglutarimide, 1-(β-n-propyl)carboxamidoglutarimide, 1-(N,N-dimethyl-β-methyl)carboxamidoglutarimide, 1-carboxamidovinyl(3-ethyl)glutarimide, 1-carboxamidovinyl(3-chloro)glutarimide, etc.; 1-carboalkoxyvinyladipimides, e.g., 1-carbomethoxyvinyladipimide, 1-(β-methyl)carboethoxyvinyladipimide, 1-carbomethoxyvinyl(3-iso-propyl)adipimide, etc.; 1-carboxamidovinyladipimides, e.g., 1(N-ethyl)-carboxamidovinyladipimide, 1-(β-iso-propyl)carboxamidovinyladipimide, 1-(N-propyl-β-n-butyl)carboxamidovinyladipimide, 1-carboxamidovinyl(3-ethyl)adipimide, etc.; 1-carboalkoxyvinylpimelimides, e.g.,1-carbomethoxyvinylpimelimide, 1-(β - methyl)carboethoxyvinylpimelimide, etc.; 1-carboxamidovinylpimelimides, e.g., 1-(β-n-propyl)carboxamidovinylpimelimide, 1-(N,N-dimethyl-β-methyl)carboxamidovinylpimelimide, 1-carboxamidovinyl-(3-ethyl)pimelimide, 1-carboxamidovinyl(3-chloro)pimelimide, etc.; 1-carboalkoxyvinylsuberimides, e.g., 1-carbomethoxyvinylsuberimide, 1-(β-methyl)carboethoxyvinylsuberimide, 1-carbomethoxyvinyl(3-n-propyl)suberimide, etc.; 1-carboxamido vinylsuberimides, e.g., 1-(N-ethyl)-carboxamidovinylsuberimide, 1-(N,N-dimethyl-β-methyl)-carboxamidovinylsuberimide, 1-carboxamidovinyl(3-ethyl)suberimide, 1-(N-ethyl)carboxamidovinyl(3-methyl)-suberimide, etc.; alkyl esters of β-(diacetylamino)acrylic acid, e.g., methyl-β-(diacetylamino)acrylate, methyl-β-(2-chlorodiacetylamino)acrylate, ethyl-β-(diacetylamino)-β-(methyl)acrylate, etc.; β-(diacetylamino)acrylamides, e.g., N-methyl-β-(diacetylamino)acrylamide, β-(diacetylamino)-β-(ethyl)acrylamide, β-(3-chlorodiacetylamino)acrylamide, β-(3-cyanodiacetylamino)acrylamide, N-ethyl-β-(3-chlorodiacetylamino)-β-(ethyl)acrylamide, etc.; alkyl esters of β-(dipropionylamino)acrylic acid, e.g., methyl-β-(dipropionylamino) acrylate, methyl-β-(2-chlorodipropionylamino)acrylate, methyl-β-(dipropionylamino)-β-n-(butyl)acrylate, etc.; β-(dipropionylamino)acrylamides, e.g., N-methyl-β-(dipropionylamino)acrylamide, β-(dipropionylamino)-β-(ethyl)acrylamide, β-(3-chlorodipropionylamino)acrylamide, β-(3-cyanodipropionylamino)acrylamide, etc.; alkyl esters of β-(dibutanoylamino)acrylic acid, e.g., methyl-β-(di-n-butanoylamino)acrylate, methyl-β-(2-chlorodi-n-butanoylamino)acrylate, ethyl-β-(di-iso-butanoylamino)-β-(methyl)acrylate, etc.; β-(dibutanoylamino)-acrylamides, e.g., N,N-diethyl-β-(di-n-butanoylamino)-acrylamide, β-(di-iso-butanoylamino)-β-(ethyl)acrylamide, β-(3-chlorodi-n-butanoylamino)acrylamide, N-ethyl-β-(3-chlorodi-n-butanoylamino)-β-(ethyl)acrylamide, etc.; alkyl esters of β-(dipentanoylamino)acrylic acid, e.g., methyl-β-(di-iso-pentanoylamino)acrylate, methyl-β-(2-chlorodi - n - pentanoylamino)acrylate, ethyl - β - (di-n - pentanoylamino) - β - (methyl)acrylate, etc.; β-(di-pentanoylamino)acrylamides, e.g., β-(di-n-pentanoylamino)-β-(ethyl)acrylamide, β-(3-chlorodi-n-pentanoylamino)acrylamide, β-(3-chloro-3'-nitrodi-n-pentanoylamino)acrylamide, N-ethyl-β-(3-chlorodi-n-pentanoylamino)-β-(ethyl)acrylamide, etc.; alkyl esters of β-(dihexanoylamino)acrylic acid, e.g., methyl-β-di-iso-hexanoylamino)-acrylate, etc.; β-(dihexanoylamino)acrylamides, e.g., N,N-diethyl-β-(di-n-hexanoylamino)acrylamide, β-(di-iso-hexanoylamino)-β-(ethyl)acrylamide, etc.; alkyl esters of β-(diheptanoylamino)acrylic acid, e.g., methyl-β-(di-n-heptanoylamino)acrylate, methyl-β - (2 - chlorodi - n-heptanoylamino)acrylate, methyl-β-(di-iso-heptanoylamino(-β-(n-butyl)acrylate, etc.; β-diheptanoylamino)acrylamides, e.g., N-methyl-β-(di-iso-heptanoylamino)acrylamide, β-(di-n-heptanoylamino)-β-(ethyl)acrylamide, β-(3-chlorodi-n-heptanoylamino)acrylamide, etc.; alkyl esters of β-(dioctanoylamino)acrylic acid, e.g., methyl-β-(di - n - octanoylamino)acrylate, methyl - β - (2 - chloridi-n-octanoylamino)acrylate, etc.; β-(dioctanoylamino)-acrylamides, e.g., N-methyl-β-(di-n-octanoylamino)acrylamide, N,N-diethyl-β-(di-iso-octanoylamino)acrylamide, β-(di-n-octanoylamino)-β-(ethyl)acrylamide, β-(3-chlorodi-n-octanoylamino)acrylamide, etc.

The compounds of the present invention are effective as insecticides, for example, in killing the eggs of two spotted spider mite (*Tetranychus telarius* L.), yellow fever mosquito larvae (*Aedes algypti* Linne), etc. The compounds may be applied in full strength or in diluted form to the insects for the purpose of destruction, and it should be understood that the compounds are not equivalent in their killing effectiveness but that some are more effective than others depending upon the type of insect and the particular compound being employed.

In order to provide a fuller understanding of the present invention, reference will be had to the following specific examples thereof:

*Example 1*

A mixture of 18.5 g. of methyl propiolate, 19.8 g. of succinimide, 100 ml. of benzene and 1 ml. of 40% solution of benzyltrimethylammonium methoxide in methyl alcohol was stirred while being refluxed for a period of 12 hours. The reaction between the succinimide and methyl propiolate occurred with an exothermic effect. After the 12 hour period the benzene was removed from the reaction mass by evaporation, leaving a black oil product. The black oil product was subjected to fractional distillation at about 0.5 mm. pressure, producing two desired fractions, one boiling at 142–145° C. and the other boiling at 146–152° C. 19.3 g. of the lower boiling fraction was obtained, whereas 10.3 g. of the higher boiling point fraction was produced. The lower boiling fraction had a refractive index at 25° C. of 1.5179, whereas the higher boiling fraction had a refractive index at 25° C. of 1.5220. Both fractions amounted to a yield of 81%. On a percentage basis, the theoretical carbon, hydrogen and nitrogen analyses of 1-carbomethoxyvinylsuccinimide are 52.46, 4.95, and 7.65, respectively. By actual analysis the lower boiling fraction was found to contain carbon, hydrogen and nitrogen analyses of 52.20, 5.14 and 7.77, respectively. Similarly, by actual analysis the higher boiling fraction was found to contain carbon, hydrogen and nitrogen analyses of 52.46, 4.89 and 7.65, respectively. In infrared analysis it was confirmed that the product had the structure of 1-carbomethoxyvinylsuccinimide.

*Example 2*

A solution of 16.8 g. of methyl propiolate and 50 ml. of benzene was added dropwise to a mixture of 17.0 g. of 2-pyrrolidone, 50 ml. of benzene and 1 ml. of 40% solution of benzyltrimethylammonium methoxide in methyl alcohol. After the materials had been combined the resultant mixture turned black immediately and the temperature rose to the boiling point thereof. The mixture was first allowed to cool to ambient temperature and then refluxed for a period of 4 hours. Thereafter, the reaction mass was washed with 50 ml. of a saturated aqueous solution of ammonium chloride followed by two washes with 50 ml. quantities of water to remove the catalyst. Benzene was removed from the reaction mass by evaporation, leaving a black oily product. The black oil was subjected to fractional distillation at a pressure of 0.3 mm., thus producing a fraction which boiled at 130–133° C. The theoretical carbon and hydrogen analyses for 1-carbomethoxyvinylpyrrolidone, on a percentage basis, are 56.79 and 6.55, respectively. By actual analysis the desired fraction was found to contain carbon and hydrogen analyses of 56.52 and 6.63, respectively. By infrared analysis it was determined that the structure of the product was that of 1-carbomethoxyvinylpyrrolidone.

*Example 3*

A mixture of 12.5 g. of the lactam of 4-aminocyclohexanecarboxylic acid, 12.6 g. of methyl propiolate, 150 ml. of benzene and 1 ml. of 40% aqueous solution of benzyltrimethylammonium hydroxide was maintained at refluxing temperature for a period of 16 hours. After the reaction mass was cooled to ambient temperature, it was washed with two 50 ml. portions of saturated aqueous solution of ammonium chloride followed by one wash with 100 ml. of water. The benzene was removed from the reaction mass by evaporation, leaving a black oil which amounted to 12.8 g. The black oil was fractionally distilled at a pressure of about 0.4–0.75 mm., thus yielding a fraction that boiled at 127–167° C. On a percentage basis, the theoretical carbon, hydrogen and nitrogen analyses for the desired addition product were 63.14, 7.23 and 6.69, respectively. By actual analysis it was found that the desired fraction had carbon and hydrogen analyses of 61.28 and 6.52, respectively.

*Example 4*

9.2 g. of methyl propiolate were added dropwise to an agitated mixture of 11.3 g. of caprolactam, 0.25 g. of sodium hydride and 150 ml. of benzene. Prior to the addition of the methyl propiolate the agitated mixture was refluxed to ensure the complete reaction of sodium hydride and caprolactam to produce sodium caprolactam. After the addition of the methyl propiolate, the temperature of the reaction mass rose, and the mass turned to a black color. The reaction mass was then stirred at ambient temperature for a period of about 16 hours. The benzene solvent was removed from the reaction mass by evaporation, leaving a black residue. 200 ml. of ethyl ether were added to the residue, resulting in an immediate precipitation of a black semisolid material. The precipitate was removed by filtration and discarded. The ether solution containing the product was washed successively with two 100 ml. portions of saturated aqueous solution of ammonium chloride and two 100 ml. portions of distilled water. The ether was then removed by evaporation. The black oil product was subjected to fractional distillation at a pressure of about 0.2 mm., yielding 2 fractions which boiled at 141–169° C. and 170–174° C. The first fraction was found to contain 59.95% carbon and 7.69% hydrogen. The higher boiling fraction was found to contain 60.48% carbon and 7.95% hydrogen. Theoretically, 1-carbomethoxyvinylcaprolactam contains 60.89% carbon and 7.67% hydrogen.

*Example 5*

A mixture of 8.4 g. of methyl propiolate and 50 ml. of benzene was added dropwise to a mixture of 14.7 g. of phthalimide, 50 ml. of benzene and 1 ml. of 40% solution of benzyltrimethyl-ammonium methoxide in methyl alcohol. The resultant mixture was heated to reflux temperature and maintained in that condition for a period of 12 hours. The supernatant liquid was decanted from a solid material which lay in the bottom of the reaction vessel. The liquid was washed with one 50 ml. portion of a saturated aqueous solution of ammonium chloride and two 50 ml. portions of water. The benzene was removed from the reaction mass by evaporation, yielding an orange-brown solid material weighing 22.1 g. and having a melting point of 84–98° C. An initial purification of the product was achieved by crystallizing the same from a solution of di-n-butyl ether. The product was thereafter distilled under a pressure of 0.3 mm. to yield a fraction having a boiling point of 161–165° C. Theoretically, 1-carbomethoxyvinylphthalimide contains 62.34% carbon and 3.92% hydrogen. By actual analysis the fraction boiling at 161–165° C. was found to contain 62.22% carbon and 3.97% hydrogen. By infrared analysis the structure of 1-carbomethoxyvinyl-phthalimide was confirmed.

*Example 6*

In this example the effectiveness of 1-carbomethoxyvinylpyrrolidone against yellow fever mosquito larvae was tested.

The culture tubes which were used in the experiment were rinsed with acetone to eliminate possible contamination by other substances. The tube was filled with 70 cc. of distilled water. 0.1 g. of 1-carbomethoxyvinylpyrrolidone was added to 10 ml. of acetone to provide a 1% concentrate. A portion of the 1% concentrate of 1-carbomethoxyvinylpyrrolidone was added to the distilled water to provide a concentration of 0.001%. The culture tube was then shaken vigorously to facilitate complete mixing. Approximately 25 larvae were transferred to the culture tube by means of a pipette. The larvae were held in the test solution at ambient temperature for a period of 24 hours. Thereafter the mortality observation was made. In this test all of the larvae were killed by the 1-carbomethoxyvinylpyrrolidone. Without the presence of the 1-carbomethoxyvinylpyrrolidone in the test solution, the solution had no effect on the larvae.

*Example 7*

Stems of Wood's prolific lima beans infested with the eggs of 2-spotted spider mites were cut into long lengths so that they would reach the bottom of a water filled test tube. 0.1 g. of 1-carbomethoxyvinylpyrrolidone was combined with 10 ml. of acetone to provide a solution of 1% concentration. The 1% solution was added to a 200 ml. Erlenmeyer flask. Three drops of Tween-20 were added to the Erlenmeyer flask and then 100 cc. of tap water were added to the Erlenmeyer flask to provide a final concentration of 0.1%. The contents of the Erlenmeyer flask were agitated to ensure complete mixing. The contents of the Erlenmeyer flask were then poured into a museum jar. The mite egg infested stems were dipped into the liquid contained in the museum jar, removed, and then allowed to dry. The dried stems were set in a green house for a one week period. Thereafter, the mortality observations were made. In this test it was found that 90% of the eggs were killed. Without the presence of the 1-carbomethoxyvinylpyrrolidone in the test solution, the solution had no effect on the mite eggs.

I claim:
1. An ester of the formula

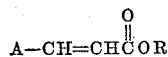

in which R is alkyl of from 1 to 5 carbon atoms and A denotes a heterocyclic nitrogen residue bonded through nitrogen to the rest of the molecule of which it forms a part and formed by loss of N-hydrogen from a heterocyclic nitrogen compound selected from the class consisting of lactams having from 4 to 9 members in the ring and cyclic imides having from 4 to 10 members in the ring.

2. The ester defined in claim 1, further limited in that the heterocyclic nitrogen compound is a lactam having from 4 to 9 members in the ring.

3. The ester defined in claim 1, further limited in that the heterocyclic nitrogen compound is a cyclic imide having from 4 to 10 members in the ring.

4. 1-carbomethoxyvinylsuccinimide.
5. 1-carbomethoxyvinylpyrrolidone.
6. 1-carbomethoxyvinylcaprolactam.
7. 1-carbomethoxyvinylphthalimide.

8. The process which comprises reacting, in the presence of from 0.001 to 5% of a basic catalyst, at a temperature of from 0° C. to 150° C. and in the presence of an inert organic diluent, an alkyl propiolate having from 1 to 6 carbon atoms in alkyl, with a nitrogenous compound having hydrogen bonded to nitrogen and selected from the class consisting of lactams having from 4 to 9 members in the ring and cyclic imides having from 4 to 10 members in the ring, and recovering from the resulting reaction product a compound of the formula

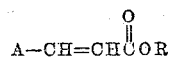

in which A denotes the residue of said nitrogenous compound formed by loss of N-hydrogen and bonded through nitrogen to the remainder of the molecule of which it forms a part and R is an alkyl radical of from 1 to 6 carbon atoms.

9. The process defined in claim 8, further limited in that the propiolate is methyl propiolate and the nitrogenous compound is succinimide.

10. The process defined in claim 8, further limited in that the propiolate is methyl propiolate and the nitrogenous compound is 2-pyrrolidone.

11. The process defined in claim 8, further limited in that the propiolate is methyl propiolate and the nitrogenous compond is the lactam of 4-aminocyclohexanecarboxylic acid.

12. The process defined in claim 8, further limited in that the propiolate is methyl propiolate and the nitrogenous compound is caprolactam.

13. The process defined in claim 8, further limited in that the propiolate is methyl propiolate and the nitrogenous compound is phthalimide.

References Cited in the file of this patent

UNITED STATES PATENTS

| | | |
|---|---|---|
| 2,288,197 | Kranzleun et al. | June 30, 1942 |
| 2,525,084 | Van Hook et al. | Oct. 10, 1950 |
| 2,578,788 | de Benneville | Dec. 18, 1951 |

OTHER REFERENCES

Fischer: Ann. V. 550, pages 196–207 (1942).

Matsukana et al.: Chem. Abs., vol. 46, pages 8094–5 (1952).